United States Patent [19]
Wachob et al.

[11] Patent Number: 5,334,975
[45] Date of Patent: Aug. 2, 1994

[54] RESIDENTIAL TIME REFERENCE SYSTEM

[76] Inventors: David E. Wachob, 8379 Glen Rd., Elkins Park, Pa. 19117; Hal M. Krisbergh, 1538 Meadowbrook Rd., Rydal, Pa. 19046

[21] Appl. No.: 731,843

[22] Filed: Jul. 16, 1991

[51] Int. Cl.[5] .................... H04M 11/04; G04C 11/00
[52] U.S. Cl. .......................... 340/825.21; 340/310 A; 340/538; 348/8; 368/46; 455/6.3
[58] Field of Search .......... 340/825.21, 310 A, 310 R, 340/310 CP, 309.4, 309.15, 538; 379/376; 455/151, 6.3; 358/86; 375/107; 368/46, 47, 55, 57

[56] References Cited

U.S. PATENT DOCUMENTS

| | | | |
|---|---|---|---|
| 4,177,454 | 12/1979 | Shinoda et al. | 340/309.4 |
| 4,386,436 | 5/1983 | Kocher et al. | 340/310 R |
| 4,442,319 | 4/1984 | Treidl | 340/310 R |
| 4,899,129 | 2/1990 | MacFadyen et al. | 340/310 R |
| 4,918,720 | 4/1990 | Buehl | 379/376 |
| 4,994,908 | 2/1991 | Kuban et al. | 358/86 |

Primary Examiner—John K. Peng
Assistant Examiner—Robert Gray
Attorney, Agent, or Firm—Allan Jacobson

[57] ABSTRACT

A method and provides for transmitting a time reference throughout a residence or other facility for use by appliances operating within the facility. A time reference is received from the headend of a cable television (CATV) system at the subscriber converter and is retransmitted to set the internal clock timers of residential appliances throughout the house. The time reference is received by the CATV converter, then encoded and modulated for transmission on the residential AC wiring system which also carries AC power to all of the appliances in the house. Individual appliances receive the encoded time reference from the AC power line, demodulate the received signal and use the received time reference to set its internal clock timer. In such manner, a residential appliance does not need to have its internal clock set by the consumer.

22 Claims, 3 Drawing Sheets

RESIDENTIAL TIME REFERENCE SYSTEM

FIELD OF THE INVENTION

The present invention relates to a method and apparatus for providing a time reference throughout a residence or other facility for use by appliances operating within the facility.

BACKGROUND OF THE INVENTION

Many appliances use time for control and display purposes. For example, a video cassette recorder (VCR) maintains an internal clock (time reference) in order to permit the user to program the VCR to record a future programming event. That is, using the internal clock, the VCR will automatically turn on, record a future program, and turn off at the end of the program recording time. As an additional feature, the VCR may display the current time and day of the week. A major problem is setting and maintaining the correct time so that the programmability feature will work properly.

Setting the internal clock of a VCR to the correct time and day is often a tedious procedure. Furthermore, the clock may need to be set more than once. In particular, an interruption in power will often result in the loss of clock data requiring that the user re-enter the current time and day into the VCR clock timer. Also, during the change to daylight savings time and back again twice a year, the time of day needs to be re-entered into the VCR internal clock. Other appliances which use time for control and display purposes have similar problems.

SUMMARY OF THE INVENTION

In accordance with the present invention, a time reference which is transmitted from the headend of a cable television (CATV) system to the subscriber converter is used to set the internal clock timers of residential appliances throughout the house. In particular, the time reference received by the CATV converter, is encoded and modulated for transmission on the residential AC wiring system which carries AC power to all of the appliances in the house. Each appliance receives the encoded time reference from the AC power line, demodulates the received signal and uses the received time reference to set its internal clock timer. In such manner, a residential appliance does not need to have its internal clock set by the consumer, either initially or following interruptions of AC power. Furthermore, the reliability and accuracy of the time keeping feature of the appliance is improved due to the elimination of human error in setting the clock.

In any event, an important convenience is achieved by having all residential appliances using an internal clock timer be automatically set and synchronized to the same time reference. Other appliances which may benefit from the use of the present invention include microwave and regular ovens, televisions, coffee makers, telephones and telephone answering machines, light timers, clocks and alarm clocks, stereo equipment, computers, facsimile machines, and security systems. Any other appliances, including appliances not presently known, which have an internal clock time reference could be used in conjunction with the present invention.

DETAILED DESCRIPTION

Figure 1:
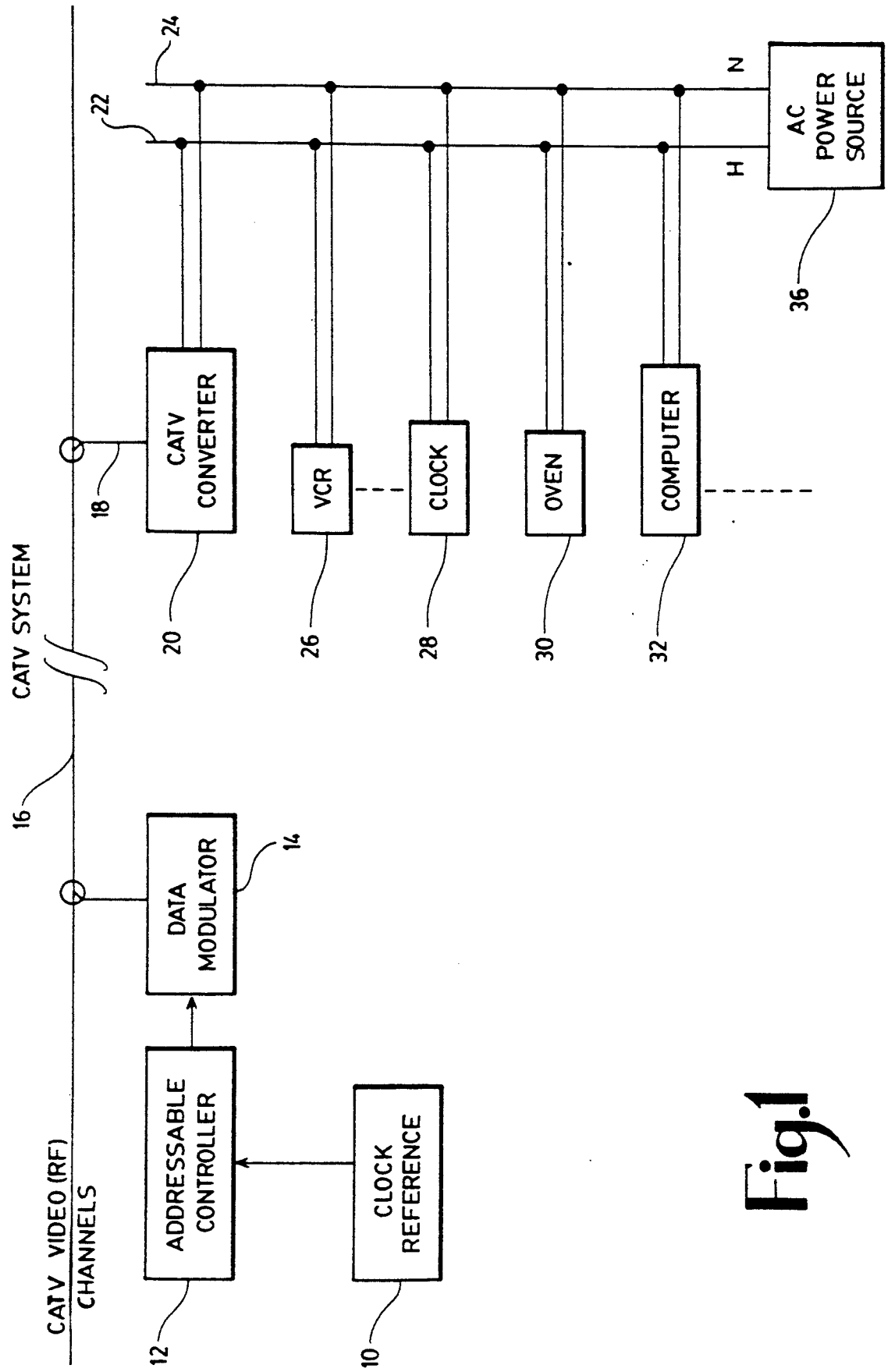
FIG. 1 is a block diagram of a CATV system including a headend and subscriber converter utilizing the residential time reference system in accordance with the present invention.

In a typical CATV system headend, a time reference is transmitted approximately once per minute as a global message to all converters. A clock reference 10, in FIG. 1, provides an accurate time reference to addressable controller 12. The addressable controller 12 encodes and formats the time reference data into a global message format as part of the addressable data stream to data modulator 14. The output of the data modulator 14, which is the encoded and modulated addressable data stream including the global message containing the encoded time reference, is combined with the regular CATV video (RF) channels and transmitted on the CATV system 16 to all subscribers converters.

The CATV signal is received by a subscriber converter 20 via a subscriber drop line 18. The converter 20 is connected to the regular AC power source 36 at AC power lines 22 and 24. Within the converter 20, the global message is received from the CATV system 16, and the time reference is decoded. The time reference is then encoded and modulated for transmission on the AC power lines 22 and 24. Other residential appliances, such as a VCR 26, an alarm clock 28, an oven 30, or a computer 32, receive the transmitted time reference on the AC power lines 22 and 24.

Figure 2:
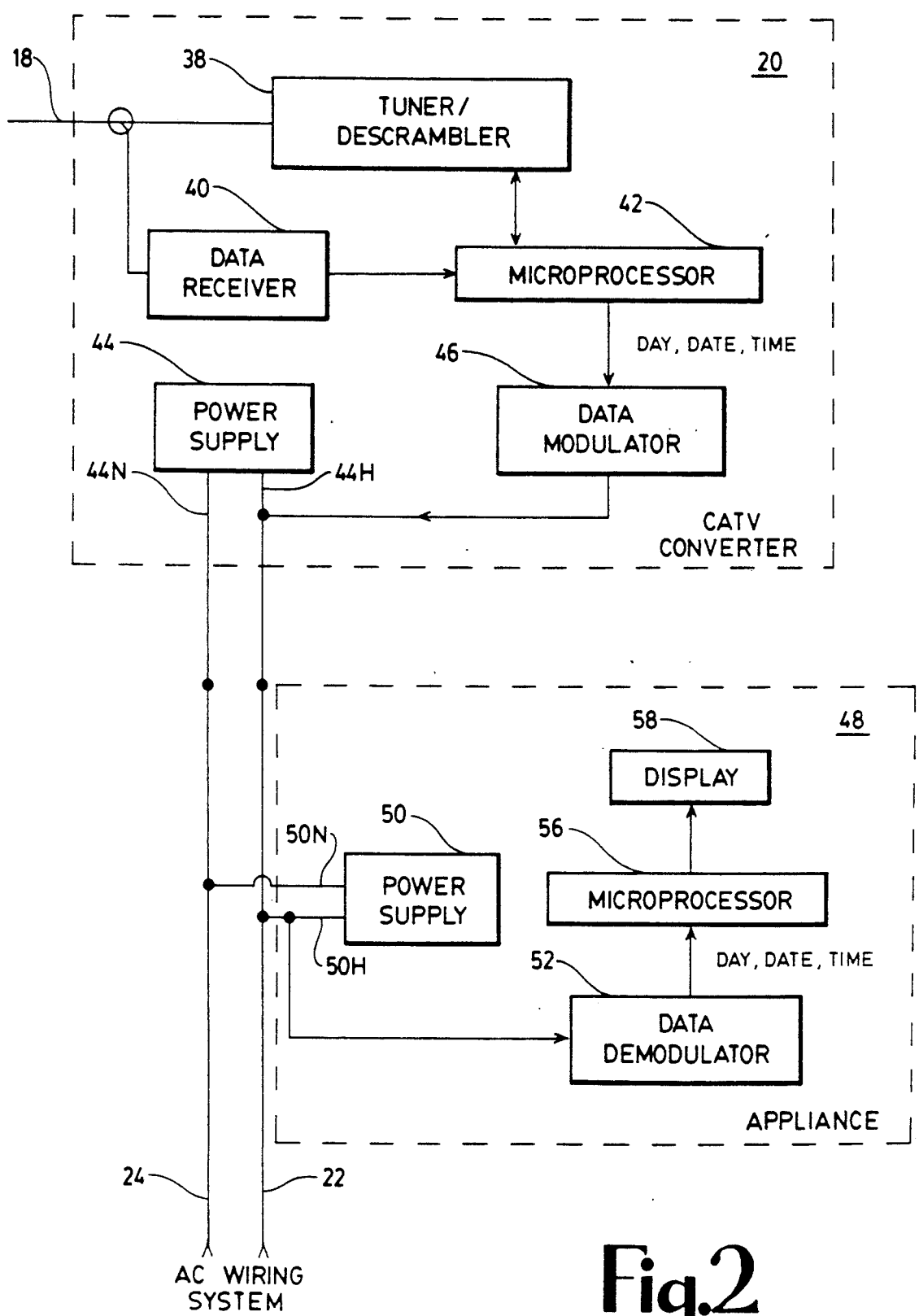
FIG. 2 is a block diagram of a CATV converter and an appliance in accordance with the present invention.

A block diagram of a converter 20 incorporating the present invention is shown in FIG. 2. The converter 20 comprises a tuner/descrambler 38, a data receiver 40, a microprocessor 42, a data modulator 46, and a power supply 44. A block diagram of an appliance 48 incorporating the present invention is also shown in FIG. 2. The appliance 48 comprises a data demodulator 52, a microprocessor 56, a display 58 and a power supply 50.

In the CATV converter 20, the output of the data modulator 46 is coupled to the hot side of the AC power line 22 at terminal 44H of the AC power supply 44. The other terminal 44N of the AC power supply 44 is connected to the neutral, or grounded side of the AC power line 24. At the appliance 48, elsewhere in the residence, the appliance power supply 50 is connected to the AC power line 24, 22 at terminals 50N and 50H, respectively. The data demodulator 52 of the appliance 48 is coupled to the hot side of the AC power line 22 at terminal 50H of the appliance power supply 50.

In operation, the CATV signal, which is received on subscriber drop line 18, is coupled to tuner/descrambler 38 where the regular CATV video programming is received. The addressable data stream is received and demodulated by data receiver 40. The demodulated addressable data stream is forwarded to microprocessor 42 where the time reference is decoded.

Figure 3:
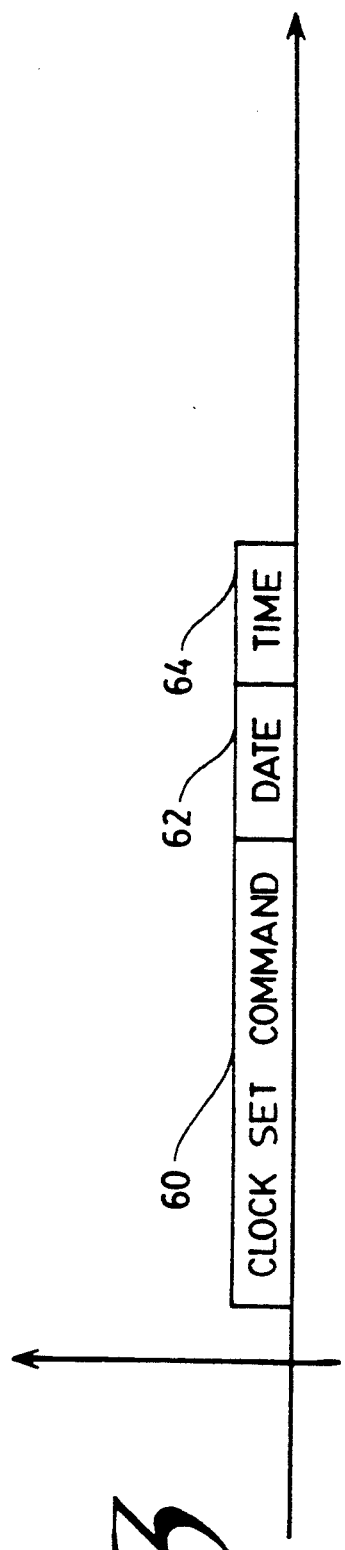
FIGS. 3 and 4 are alternate embodiments of a data format which may be used in conjunction with the present invention.
Figure 4:
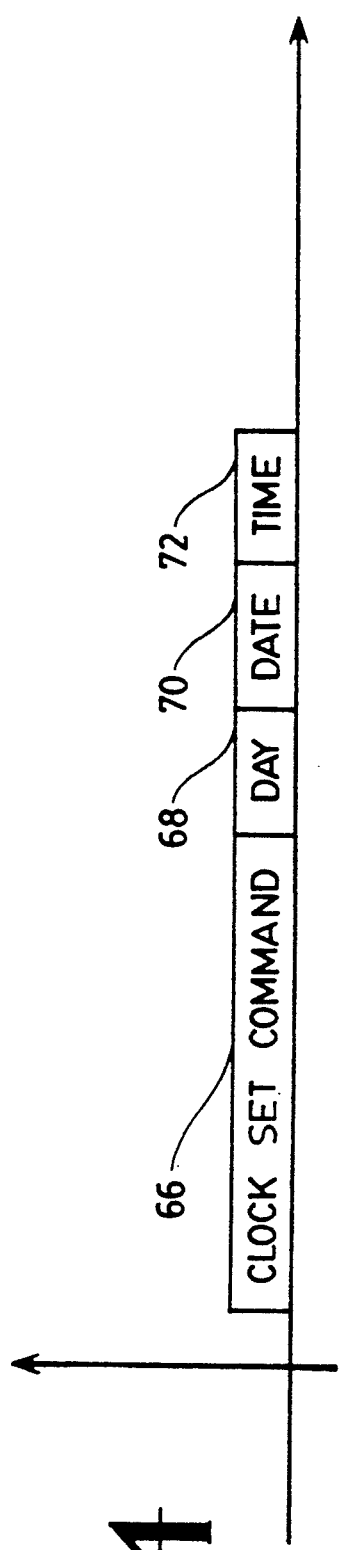

A data format for the global time reference message is shown in FIG. 3. The global time reference message format includes a global clock set command 60. All subscriber converters respond to the clock set command by reading the following data fields which include a date field 62 and a time field 64. The microprocessor 42 may contain a universal calendar to determine the day of the week represented by the received date. Alternatively, the global time reference message format may include a day field 68 in addition to the global clock set command 66, and the date 70 and time 72 data fields as shown in FIG. 4.

Microprocessor 42 formats the received day, date and time data in to a residential time reference message format which may be the same message format as the global time reference message format received from the CATV system, or may be translated into any other suitable message format. The data modulator 46 modulates the residential time reference message into a modulation format suitable for transmission on the AC power line 22. While the preferred modulation format for the global time reference message on the CATV system is frequency shift keyed (FSK) modulation, the preferred modulation format for the residential time reference message on the AC power line 22 is spread spectrum. However, any suitable data format and modulation format may be used in either the CATV system or the AC power line 22.

The modulated residential time reference message is carried by the hot side of the AC power line 22 as a spread spectrum signal throughout the residence to all appliances which are connected to the AC power wiring system. In particular, the spread spectrum modulated residential time reference message reaches the appliance 48 at the power supply 50 terminal 50H. The modulated residential time reference message is received and demodulated by the data demodulator 52 where the original residential time reference message is recovered and forwarded to microprocessor 56. Day, date and time data is recovered from the residential time reference message in the microprocessor 56. The recovered time reference may, for example, be used for programmable features of the appliance 48, and may be displayed on a suitable display device 58. In between the times that appliance 48 receives successive residential time reference messages (approximately one per minute), the internal timer of appliance 48 maintains continuous proper time.

It is to be noted that the delivery system carrying the global time reference message can be any communication channel, such as a broadcast satellite (DBS) transponder, a fiberoptic cable, and the like. Also, the residential distribution system for carrying the residential time reference message in the present embodiment is the AC power line. However, any other residential household wiring, such as the telephone line, coaxial cable, or even a wireless intercom system may be used as the residential distribution system to carry the residential time reference message. Finally, although the detailed embodiment of the invention is described in terms of a residential environment, the present invention is equally suited to a variety of industrial or military applications, such as hospitals, factories, airports or any other facility which would benefit from a system of distributing a time reference to automatically reset and synchronize all appliances to a consistent and accurate time reference.

What is claimed is:

1. A method for distributing the current time throughout a facility, said facility being connected by means of a converter to a broadcast video communication channel including a first time reference message having time reference data corresponding to the current time, and having at least one appliance connected to the AC power line wiring of said facility, said appliance having an internal clock including means for reading a second time reference message and setting the time of said clock in response to said second message, said method comprising:
   receiving at said converter said first time reference message including time reference data corresponding to said current time from said broadcast video communication channel;
   retransmitting from said converter said received time reference data corresponding to said current time as said second time reference message on said AC power line wiring of said facility;
   receiving said second time reference message on said AC power line wiring at said appliance; and
   setting said internal clock of said appliance responsive to said received second time reference message to said current time.

2. A method in accordance with claim 1, wherein said broadcast video communication channel comprises a CATV system.

3. A method in accordance with claim 1, wherein said broadcast video communication channel comprises a direct broadcast satellite system.

4. A method for distributing the current time throughout a facility having an AC power line wiring, said facility being connected by means of a converter to a broadcast video communication channel including a first time reference message having time reference data corresponding to the current time, and having at least one appliance connected to said wiring of said facility, said appliance including an internal clock having means for reading a second time reference message and setting the time of said clock in response to said second message, said method comprising:
   receiving at said converter said first time reference message including time reference data corresponding to said current time from said broadcast video communication channel; and
   retransmitting from said converter said received time reference data corresponding to said current time as said second time reference message on said wiring of said facility.

5. A method for distributing a first time reference message having time reference data corresponding to the current time in a facility connected by means of a converter to a CATV system, said facility having an AC power line, and at least one appliance connected to said AC power line, said appliance having an internal clock including means for reading a second time reference message and setting the time of said clock in response to said second message, said method comprising:
   receiving at said converter said first time reference message including time reference data corresponding to said current time from said CATV system;
   retransmitting from said converter said received time reference data corresponding to said current time as said second time reference message on said AC power line; and
   receiving said second time reference message including said time reference data corresponding to said current time on said AC power line at said appliance.

6. A method in accordance with claim 5, wherein said step of receiving said first time reference message including time reference data comprises generating day data from the date data received in said received time reference data.

7. A method in accordance with claim 5, wherein said step of transmitting said first time reference data comprises modulating a spread spectrum data encoded signal.

8. A method in accordance with claim 5, wherein said step of receiving said second time reference data comprises demodulating a spread spectrum data encoded signal.

9. A method in a CATV converter for distributing the current time including a first time reference message having time reference data corresponding to the current time in a facility connected by means of a converter to a CATV system, said facility having an AC power line, and at least one appliance connected to said AC power line, said appliance including an internal clock having means for reading a second time reference message and setting the time of said clock in response to said second message, said method comprising:
  receiving at said converter said first time reference message including time reference data corresponding to said current time from said CATV system; and
  retransmitting from said converter said received time reference data corresponding to said current time as said second time reference message on said AC power line.

10. A method for distributing the current time in a facility connected by means of a converter to a CATV system including a first time reference message having time reference data corresponding to the current time, said facility having an AC power line, and at least one appliance having an internal clock, said appliance being connected to said AC power line, and said clock including means for reading a second time reference message and setting the time of said clock in response to said second message, said method comprising:
  receiving at said converter said first time reference message including time reference data corresponding to said current time from said CATV system;
  demodulating said first time reference message to recover said time reference data corresponding to said current time;
  retransmitting from said converter said received time reference data as said second time reference message on said AC power line;
  receiving said second time reference message on said AC power line at said appliance;
  demodulating said second time reference message to recover said time reference data corresponding to said current time; and
  transferring said time reference data corresponding to said current time to said internal clock of said appliance.

11. A method for providing the current time for an appliance in a facility connected to a CATV system, said facility having an AC power line, and said appliance having an internal clock coupled to said AC power line, said internal clock including means for reading time reference data transferred thereto and setting the time of said clock in response to said data, said facility further including a CATV converter for receiving a first time reference message including said time reference data corresponding to the current time from said CATV system, demodulating said first time reference message to recover said time reference data, and retransmitting said received time reference data as a second time reference message on said AC power line, said method comprising:
  receiving said second time reference message on said AC power line at said appliance;
  demodulating said second time reference message to recover said time reference data corresponding to said current time; and
  transferring said time reference data to said internal clock of said appliance to set said internal clock of said appliance to said current time.

12. An apparatus for distributing the current time throughout a facility, said facility being connected by means of a converter to a broadcast video communication channel including a first time reference message having time reference data corresponding to the current time, and having at least one appliance connected to the AC power line wiring of said facility, said appliance having an internal clock including means for reading a second time reference message and setting the time of said clock in response to said second message, said apparatus comprising:
  first means connected to said converter for receiving said first time reference message including time reference data corresponding to said current time from said broadcast video communication channel;
  second means connected to said first means for retransmitting said received time reference data as said second time reference message corresponding to said current time on said AC power line wiring of said facility;
  means for receiving said second time reference message on said AC power line wiring at said appliance; and
  means for setting said internal clock of said appliance responsive to said received second time reference message to said current time.

13. An apparatus in accordance with claim 12, wherein said broadcast video communication channel comprises a CATV system.

14. An apparatus in accordance with claim 12, wherein said broadcast video communication channel comprises a direct broadcast satellite system.

15. An apparatus for distributing the current time throughout a facility having an AC power wiring, said facility being connected by means of a converter to a broadcast video communication channel including a first time reference message having time reference data corresponding to the current time, and having at least one appliance connected to said wiring of said facility, said appliance including means for reading and responding to a time reference message delivered thereto, said apparatus comprising:
  first means connected to said converter for receiving said first time reference message including time reference data corresponding to said current time from said broadcast video communication channel; and
  second means connected to said first means for retransmitting said received time reference data corresponding to said current time as a second time reference message to said appliance on said wiring of said facility.

16. An apparatus for distributing a first time reference message having time reference data corresponding to the current time in a facility connected by means of a converter to a CATV system, said facility having an AC power line, and at least one appliance connected to said AC power line, said appliance having an internal clock and including means for reading a second time reference message and setting the time of said clock in response to receipt of said second message, said apparatus comprising:

first means connected to said converter for receiving said first time reference message including time reference data corresponding to said current time from said CATV system;

second means connected to said first means for retransmitting said received time reference data corresponding to said current time as said second time reference message corresponding to said current time on said AC power line; and means for receiving said second time reference message including said time reference data corresponding to said current time on said AC power line at said appliance.

17. An apparatus in accordance with claim 16, wherein said means for receiving said first time reference message including time reference data comprises means for generating day data from the date data received in said received time reference data.

18. An apparatus in accordance with claim 16, wherein said means for transmitting said first time reference data comprises means for modulating a spread spectrum data encoded signal.

19. An apparatus in accordance with claim 16, wherein said means for receiving said second time reference data comprises means for demodulating a spread spectrum data encoded signal.

20. An apparatus in a CATV converter for distributing a first time reference message having time reference data corresponding to the current time in a facility connected to a CATV system by means of said converter, said facility having an AC power line, and at least one appliance connected to said AC power line, said appliance including an internal clock having means for reading a second time reference message and setting the time of said clock in response to said second message, said apparatus comprising:

means for receiving said first time reference message including time reference data corresponding to said current time from said CATV system; and means for retransmitting said received time reference data as said second time reference message corresponding to said current time on said AC power line.

21. An apparatus for distributing the current time in a facility connected by means of a converter to a CATV system including a first time reference message having time reference data corresponding to the current time, said facility having an AC power line, and at least one appliance having an internal clock, said appliance being connected to said AC power line and including means for reading time reference data transferred to said clock and resetting said clock in response to said data, said apparatus comprising:

first means connected to said converter for receiving said first time reference message including time reference data from said CATV system;

second means connected to said first means for demodulating said first time reference message to recover said time reference data;

third means connected to said second means for retransmitting said received time reference data as a second time reference message on said AC power line;

means for receiving said second time reference message on said AC power line at said appliance;

means for demodulating said second time reference message to recover said time reference data; and means for transferring said time reference data to said internal clock of said appliance.

22. An apparatus for providing the current time for an appliance in a facility connected to a CATV system, said facility having an AC power line, said appliance having an internal clock including means for setting the time of said clock, and said appliance being coupled to said AC power line, said facility further including a CATV converter for receiving a first time reference message corresponding to the current time including time reference data from said CATV system, demodulating said first time reference message to recover said time reference data, and retransmitting said received time reference data as a second time reference message on said AC power line, said apparatus comprising:

first means for receiving said second time reference message on said AC power line at said appliance;

second means connected to said first means for demodulating said second time reference message to recover said time reference data; and third means for reading said recovered time reference data for activating said time setting means for setting said internal clock of said appliance to said current time.

* * * * *